Aug. 9, 1927. 1,638,348

L. I. LEWIS

TRANSMISSION GEARING

Filed Nov. 18, 1924 2 Sheets-Sheet 2

Inventor
L. I. Lewis

Patented Aug. 9, 1927.

1,638,348

UNITED STATES PATENT OFFICE.

LEON I. LEWIS, OF MIDWEST, WYOMING.

TRANSMISSION GEARING.

Application filed November 18, 1924. Serial No. 750,622.

The present invention relates to variable speed gearing for motor driven vehicles, and has for its object to provide a simple and effective arrangement of parts which are readily accessible for any required purpose, the gearing embodying a few number of parts which are so disposed as to equalize the driving stresses.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 4 is a detail sectional view on the line 4—4 of Figure 1.

Figure 1:
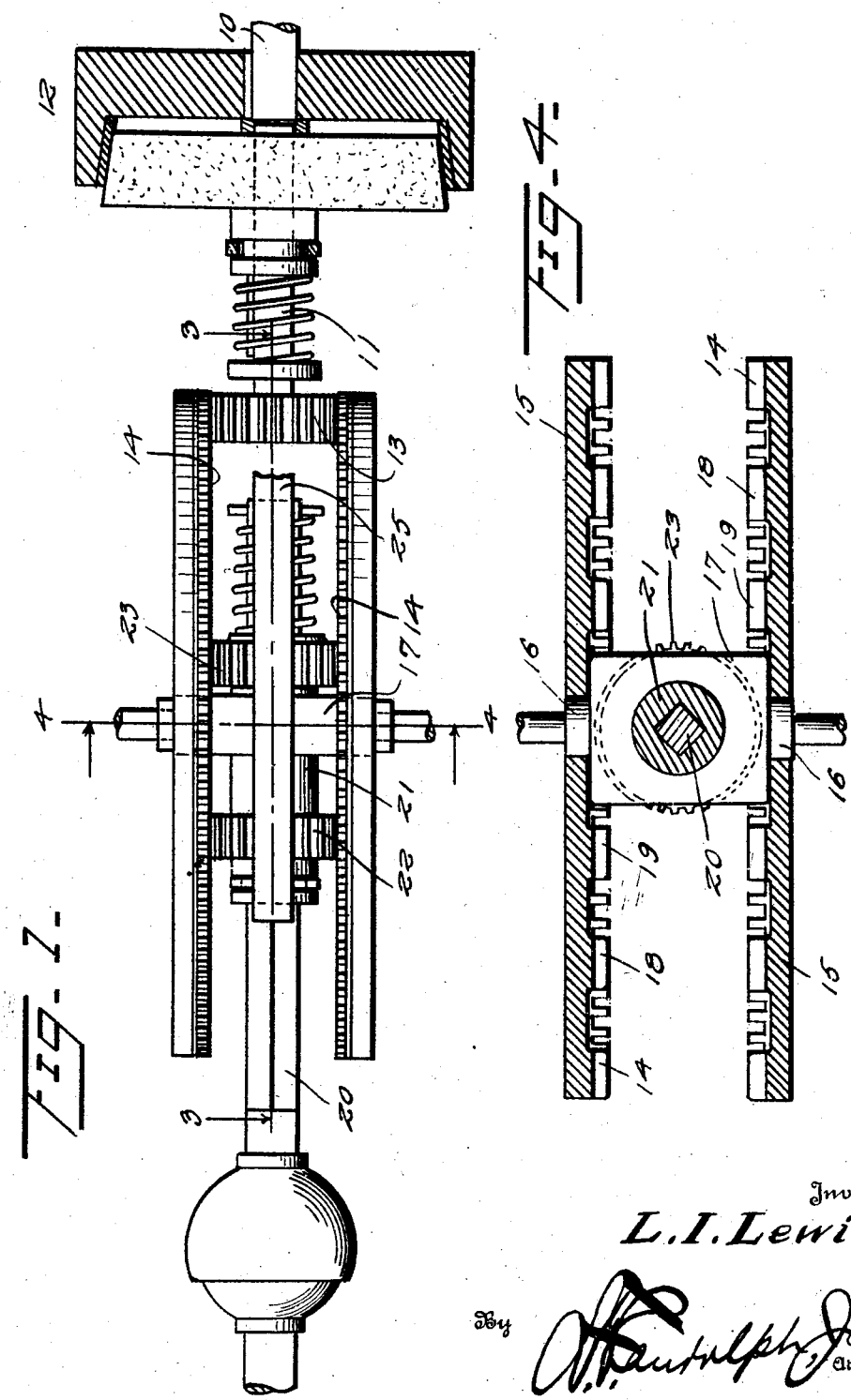
Figure 1 is a top plan view of a transmission gearing embodying the invention.
Figure 2:
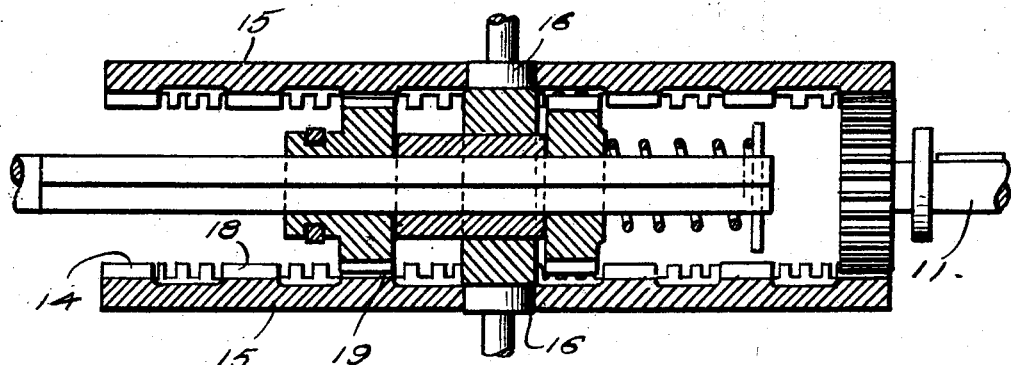
Figure 2 is a horizontal sectional view thereof.
Figure 3:
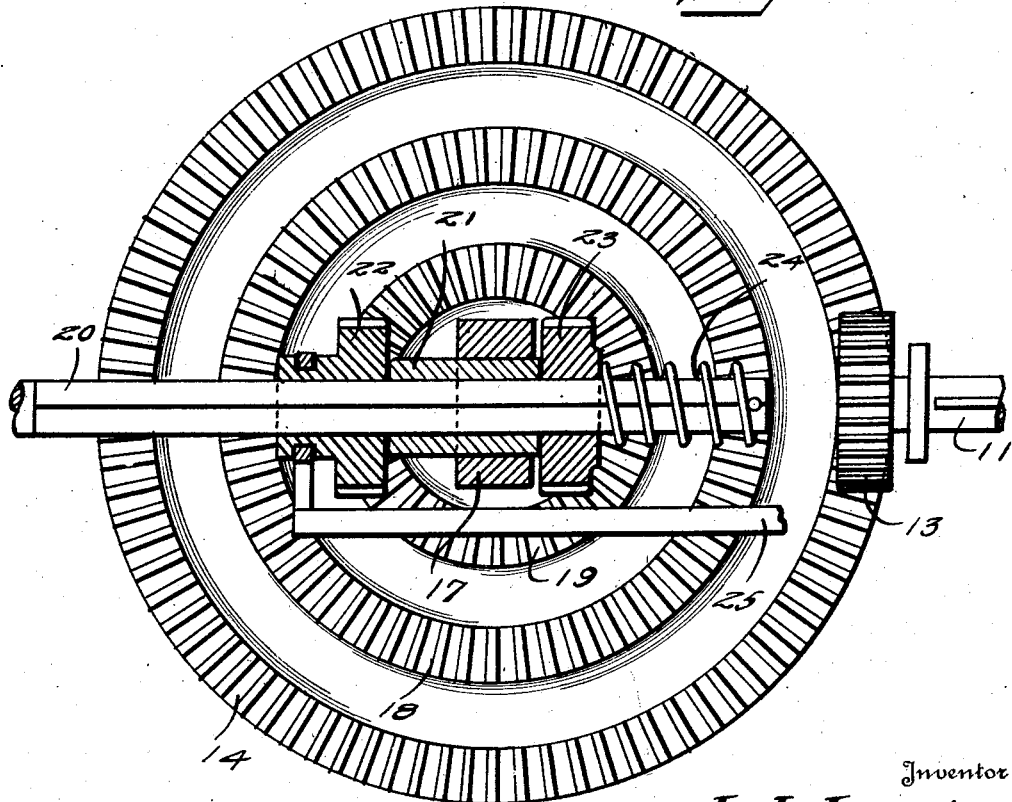
Figure 3 is a sectional view on the line 3—3 of Figure 1.

The numeral 10 designates the usual drive shaft from the engine and 11 an intermediate shaft between the transmission and the engine shaft 10 and adapted to be connected to the latter by means of the usual clutch 12. The drive pinion 13 is secured to the shaft 11 and is in mesh with cog gearing 14 on the inner or opposing faces of disks 15 which are loosely mounted upon bearings 16 at opposite sides of a block 17 and preferably forming a part thereof. Each of the disks 15 is provided with cog gearing 18 and 19 in addition to the cog gearing 14, the several cog gearings being concentric and spaced apart. A drive shaft 20 passes through the block 17 and between the disks 15 and receives a sleeve 21 and gear wheels 22 and 23. The sleeve 21 has a limited sliding movement in the block 17 and serves to hold the gear wheels 22 and 23 spaced apart a given distance. A spring 24 mounted upon the drive shaft 20 normally exerts a pressure against the gear wheel 23 to hold it close to the block 17 and in neutral position or out of register with the cog gearing 19. An operating bar 25 loosely engages an extension of the gear wheel 22 and is adapted to be operated to move said gear wheel from one to the other of the several sets of cog gearing 14, 18, and 19 accordingly as the engine is to be driven at high, intermediate, or low speed, or to a neutral position so as to clear the cog gearing. When the part 25 is moved to bring the gear wheel 22 into engagement with the sleeve 21 and in close relation to the block 17, the gear wheel 23 is moved away from the block 17 and into position so that its teeth mesh with the teeth of the cog gearing 19, thereby reversing the motion. Rearward movement of the gear wheel 22 admits of the spring 24 coming into play to throw the gear wheel 23 out of mesh with the cog gearing 19 and when the teeth of the gear wheel 22 mesh with the teeth of the cog gearing 19, the vehicle is driven at low speed and when the gear wheel 22 is in mesh with the cog gearing 18 the vehicle is driven at an intermediate speed, and when the gear wheel 22 is in mesh with the cog gearing 14, the vehicle is in high speed.

What is claimed is:—

Transmission gearing comprising a block provided with oppositely disposed bearings, disks journaled upon the bearings and provided upon their inner faces with concentric gear teeth, means for rotating the disks in reverse directions, a shaft, gear wheels mounted upon the shaft on opposite sides of the block and rotatable therewith, a sleeve on the shaft between the gear wheels, said sleeve being slidably mounted in said block, a spring normally holding one of the gear wheels in predetermined position and engaging one end of said sleeve, and means for positively moving the other gear wheel on the shaft in either direction.

In testimony whereof I affix my signature.

LEON I. LEWIS.